(12) United States Patent
Wu et al.

(10) Patent No.: US 7,230,599 B2
(45) Date of Patent: Jun. 12, 2007

(54) DISPLAY DEVICE FOR DATA PROCESSING EQUIPMENT

(75) Inventors: Yaz-Tzung Wu, Taipei (TW);
Ming-Yuan Liu, Taipei (TW);
Tien-Ming Chan, Taipei (TW)

(73) Assignee: Inventec Corporation, Taipei (TW)

( * ) Notice: Subject to any disclaimer, the term of this patent is extended or adjusted under 35 U.S.C. 154(b) by 576 days.

(21) Appl. No.: 10/773,219

(22) Filed: Feb. 9, 2004

(65) Prior Publication Data

US 2005/0174366 A1   Aug. 11, 2005

(51) Int. Cl.
*G09G 5/00* (2006.01)

(52) U.S. Cl. .............................. 345/87; 345/5; 345/31; 345/168; 345/905; 349/12

(58) Field of Classification Search .................. 345/1.1, 345/5, 87, 156, 167, 168, 169, 905; 361/681; 455/556, 566
See application file for complete search history.

(56) References Cited

U.S. PATENT DOCUMENTS 6,643,124 B1 * 11/2003 Wilk .......................... 361/681

| 2003/0058568 | A1 * | 3/2003 | Yanagita | 360/73.04 |
| 2003/0098857 | A1 * | 5/2003 | Gettemy et al. | 345/173 |
| 2003/0160755 | A1 * | 8/2003 | Gettemy et al. | 345/156 |
| 2003/0214612 | A1 * | 11/2003 | Freeman | 349/12 |
| 2004/0264441 | A1 * | 12/2004 | Jalkanen et al. | 370/352 |
| 2004/0266350 | A1 * | 12/2004 | Kim | 455/41.2 |

* cited by examiner

*Primary Examiner*—Bipin Shalwala
*Assistant Examiner*—Vincent E. Kovalick
(74) *Attorney, Agent, or Firm*—Rabin & Berdo, P.C.

(57) ABSTRACT

A display device adopted for use on data processing equipment includes a hollow case for housing a turnable axle and an elastic element, a pliable LCD screen wound around the peripheral surface of the axle, and a retaining member fastening to one side of the pliable LCD screen to receive a force from users to pull and turn the axle so that the LCD screen may be stretched outside the case to a use position, and receive image signals from the data processing equipment through a connection port located on one side of the case to generate and display pictures. The elastic element provides a stretch returning elastic force to drive the axle to turn in a reverse direction to wind the LCD screen in a retraction position in the case.

9 Claims, 4 Drawing Sheets

DISPLAY DEVICE FOR DATA PROCESSING EQUIPMENT

FIELD OF THE INVENTION

The invention relates to a display device adopted for use on data processing equipment and particularly to a display device for data processing equipment that includes a pliable liquid crystal display (LCD) screen, retractable by rolling.

BACKGROUND OF THE INVENTION

The electronic industry has grown significantly in recent years. Applications of computer equipment are no longer limited to a small number of people. They have been widely used in people's daily life. In general, data processing equipment includes a computer host, input devices and display devices. The Cathode Ray Tube (CRT) display device was the main stream in the past. Such type of products has a large size, a great thickness, and flickering pictures. The curvature of the screen is difficult to be fabricated without any defect. Nowadays, with the advance of semiconductor technology, the LCD has been developed and introduced. The LCD has the advantage of being thin and small, saves a lot of space, provides steady pictures without flickering, and consumes little electric power. It has gradually replaced the conventional CRT display device.

Now also a pliable LCD screen appears on the market. It adopts the principles and technologies of physics and chemistry to generate pictures. It has the following characteristics:

1. Low electric power consumption: compared with the CRT display device or general LCD, the pliable LCD screen consumes much less electric power. One of the special features of the pliable LCD screen is that it consumes almost no electric power when the display picture remains still. This can greatly increase utilization and standby time for handheld data processing devices such as a Personal Digital Assistant (PDA) or notebook computer.
2. Reduced thickness: While the general LCD has a smaller thickness than the conventional CRT display device, it still takes a substantial space and has a substantial weight that could become a burden for users to carry around. The pliable LCD screen is significantly thinner and has a thickness comparable with a few sheets of paper. It is much easier for users to carry outdoors to do the required data processing tasks.
3. Folding and bendable: Besides the lower power consumption and reduced thickness mentioned above, the pliable LCD screen also may be folded or bent like a piece of paper, unlike other display devices on the market. Thus users can use it to read data and information anywhere anytime, and retract it by folding or rolling for storing when not in use.

At present Sharp Co. and NEC Co. of Japan have jointly developed reflective LCD technologies. Toshiba Co. of Japan has devoted research and development efforts in low temperature high polymer silicon liquid crystal technologies, and Minolta Co. of Japan has developed reflective cholesterol liquid crystal material. Iridigm Co. of U.S.A. has developed a fabrication process on glass substrates that is based on a micro electromechanical architecture and coupled with thin film LCD screen manufacturing and Interferometric Modulator (iMod) techniques. It already has satisfactory results in terms of brightness and color. All the companies mentioned above also have prototypes for the pliable LCD screen. Those techniques have reached a well-developed stage, and the related products predicted will be available on the market in the near future.

SUMMARY OF THE INVENTION

Based on the related developments and product characteristics of the pliable LCD screen set forth above, it is natural that the design of data processing equipment also have to be improved to take the advantages of the pliable LCD screen.

Therefore, the present invention aims at providing a display device for data processing equipment. It can generate pictures according to image signals transferred by the data processing equipment, and can be retracted to facilitate carrying.

The display device according to the invention mainly includes a case, an axle, a pliable LCD screen and an elastic element. The case has a housing compartment to hold the turning axle inside. The pliable LCD screen may be wound around the peripheral surface of the axle and housed in the case. The pliable LCD screen has one side fastened to a retaining member for pulling the pliable LCD screen and turning the axle in a positive direction so that the pliable LCD screen may be stretched from the case for a selected distance to a use position. The case has a connection port on one side to receive image signals, transferred from the data processing equipment so that pictures may be generated and displayed for user viewing. The elastic element is held in the housing compartment of the case to provide a stretch returning elastic force to turn the axle in a reverse direction so that the pliable LCD screen may be wound around the outer surface of the axle and can be retracted in the case, to facilitate carrying.

Thus the pliable LCD screen according to the invention may be pulled out from the case to a use position, generating pictures according to the image signals transferred from the data processing equipment. It also may be selectively retracted in the case. Namely, the viewing range of the displaying picture is not restricted. Only the required operation space of the electronic elements has to be considered. The bending property of the pliable LCD screen can further reduce the size of the data processing equipment. This can improve carrying convenience. It is a new design that offers significant benefits.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
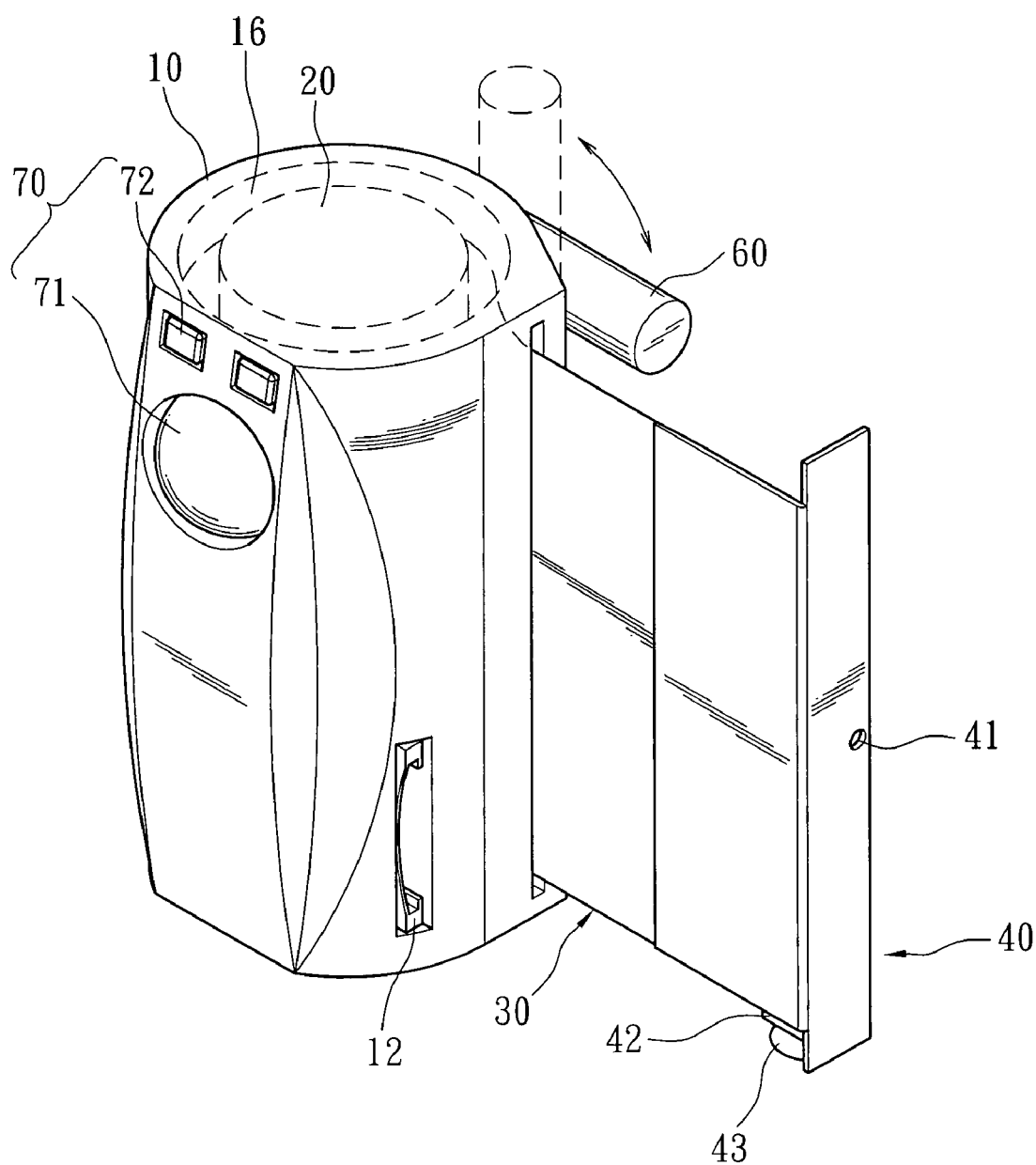
FIG. 1 is a perspective view of a display device according to the invention adopted for use on data processing equipment.
Figure 2:
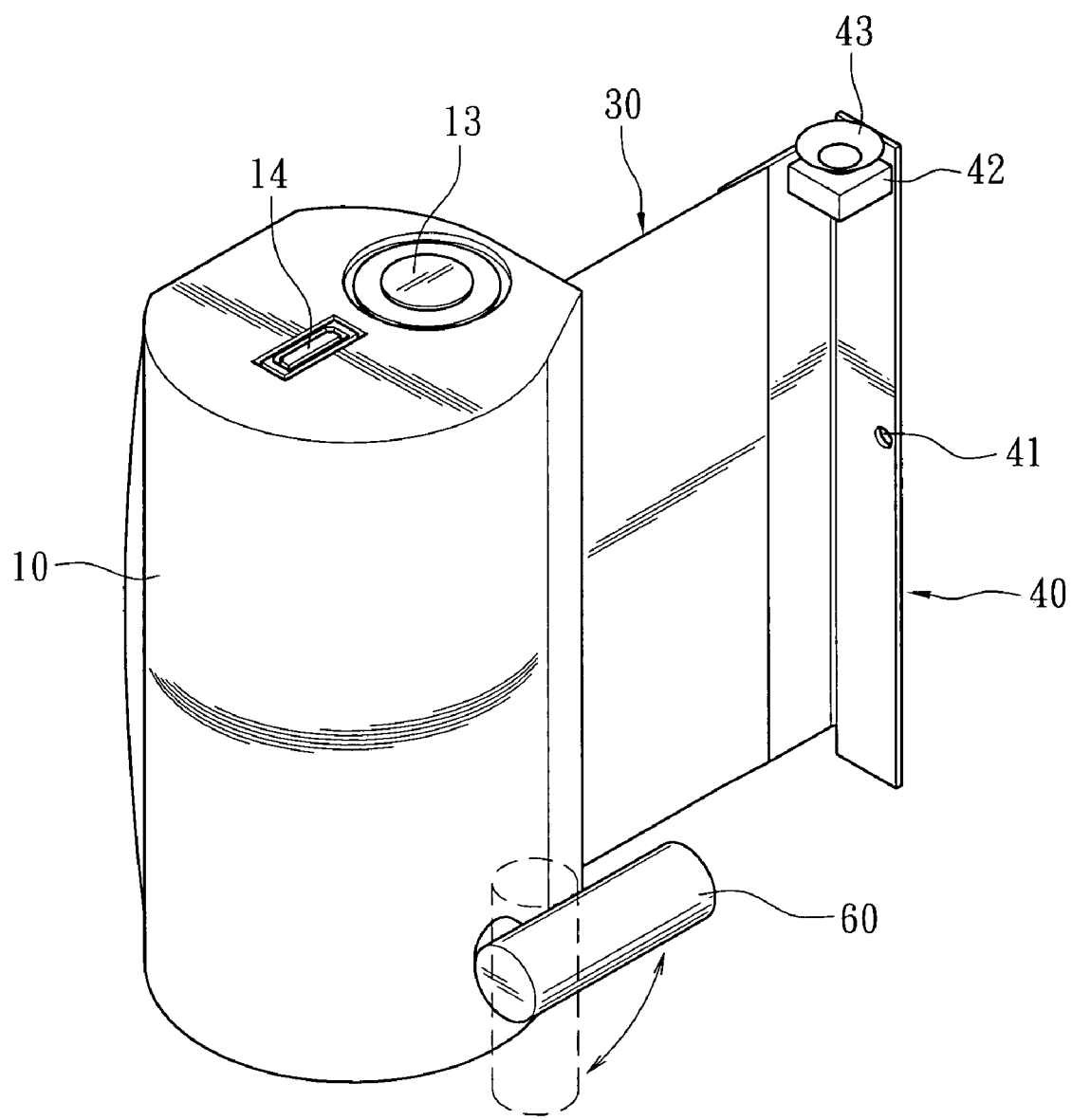
FIG. 2 is another perspective view of the display device according to the invention adopted for use on data processing equipment.
Figure 3:
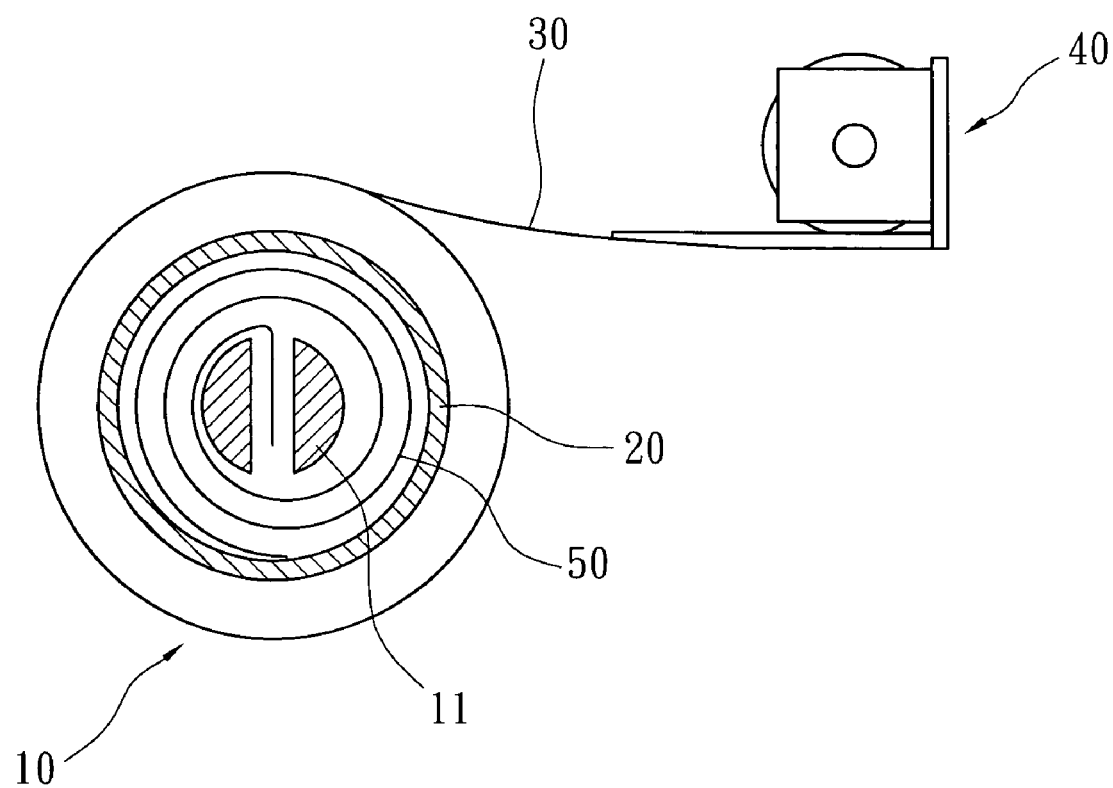
FIG. 3 is a cross section of the display device according to the invention adopted for use on data processing equipment.

The display device adopted for use on data processing equipment according to the invention aims to generate and display pictures based on image signals transferred from the data processing equipment. Refer to FIGS. 1, 2 and 3 for a preferred embodiment of the invention. The display device according to the invention mainly includes a case 10, an axle 20, a pliable LCD screen 30 and an elastic element 50. The case 10 has a housing compartment 16 and an elongated slot 17 communicating with the housing compartment 16. The case 10 has a rear side attaching to a radio transmission unit 60 which is an antenna to receive external radio communication signals. It is connected to a connection port 14 located at the bottom side of the case 10, and can transfer data with a data processing equipment 200 (also shown in FIG. 4). The case 10 further includes an electric power module 13 at the bottom side to provide driving electric energy required for the pliable LCD screen 30 during operation. Of course, the electric power module 13 is an optional feature. The electric power also may be obtained from the data processing equipment 200 through the connection port 14 (referring to FIG. 4). The case 10 also has a hump section on the outside to contain an input module 70. The input module 70 is electrically connected to the connection port 14. It includes a track ball 71 and function keys 72 to enable users to operate and control the data processing equipment 200 (referring to FIG. 4). Besides, the case 10 has a expanding slot 12 is connected to the data processing equipment 200 via connection port 14, and an external memory card (not shown in figure) can insert in to the expanding slot 12 to link the data processing equipment 200 for transferring data.

The axle 20 is turning in the housing compartment 16. It is a hollow barrel with a housing chamber 21 inside. The case 10 has a leveling member 11 corresponding to the axle 20 that runs through the housing chamber 21. The elastic element 50 is a helical spring coupling on the leveling member 11. It has two ends engaging respectively with the axle 20 and the leveling member 11. The pliable LCD screen 30 is a rolling flat sheet. As shown in FIG. 3, the pliable LCD screen 30 is wound around the peripheral surface of the axle 20 and housed in the housing chamber 16 with the axle 20. To facilitate explanation, the condition in which the pliable LCD screen 30 is wound around the peripheral surface of the axle 20 is called the retraction position. Please be noted that the elastic element 50 mainly provides a stretch returning elastic force for the axle 20. Hence it has to form a coupling relationship with the case 10 and the axle 20. Coupling of the elastic element 50 to meet the foregoing condition may have many forms. The one disclosed above is merely an example, and should not be deemed as the limitation of the embodiment.

The retaining member 40 is fastened to one side of the pliable LCD screen 30, and is exposed outside the elongated slot 17 of the case 10. It has an aperture 41 at a desired location, a balance weight 42 and a suction cup 43 on the bottom side thereof.

Figure 4:
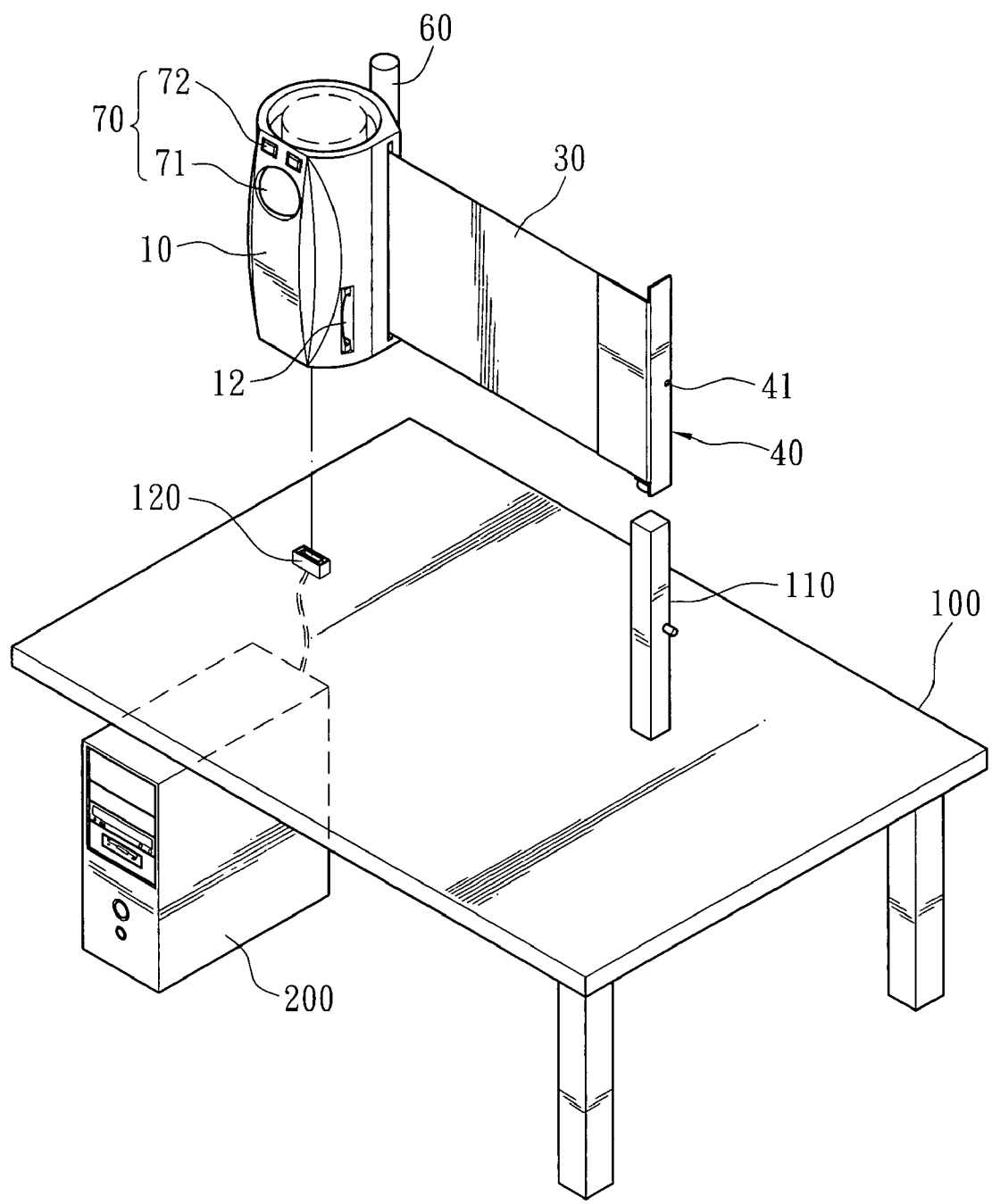
FIG. 4 is a schematic view of the display device according to the invention adopted for use on data processing equipment in a use condition.

Referring to FIG. 4, when the invention is used on data processing equipment it may be mounted on a table 100. The table 100 has an anchor pillar 110 and a communication slot 120 corresponding to the connection port 14. The communication slot 120 is connected to the data processing equipment 200. When the case 10 is mounted on the table 100, the connection port 14 may be inserted into the communication slot 120 to link the data processing equipment 200 for transferring data.

Users may grasp the retaining member 40 and pull the pliable LCD screen 30. The axle 20 is driven and turned in the positive direction so that the pliable LCD screen 30 may be stretched through the elongated slot 17 of the case 10 for a selected range, and moved away from the axle 20 to release the winding condition. The anchor pillar 110 has a strut to couple with the aperture 41 of the retaining member 40 to maintain the pliable LCD screen 30 in the stretched condition which is defined as the use position. This is the position where the pliable LCD screen 30 is pulled by a force to be released from the retraction position around the axle 20 to the stretched position outside the case 10 for use. The balance weight 42 and suction cup 43 at the bottom side of the retaining member help the pliable LCD screen 30 to maintain at the use position.

After the foregoing setup operation is completed, the pliable LCD screen 30 can receive image signals from the data processing equipment 200 through the connection port 14 and generate display pictures for user viewing. Users can operate and control the data processing equipment 200 through the input module 70. The radio transmission unit 60 on the rear side of the case 10 may be turned to enable the data processing equipment 200 to transmit external communication signals through the connection port 14, or receive radio signals of TV broadcasting so that pictures may be displayed for user viewing.

Retracting of the pliable LCD screen 30 is simple. The user only has to release the coupling of the retaining member 40 and the anchor pillar 110. As shown in FIG. 3, when the user pulls and stretches the pliable LCD screen 30 from the case 10 earlier, the axle 20 turns in the positive direction, and the elastic element 50 coupled on the leveling member 11 and the axle 20 is deformed under force. Once the coupling relationship between the retaining member 40 and the anchor pillar 110 is released, the elastic element 50 provides a stretch returning elastic force to drive the axle 20 to turn in the reverse direction. Thus the pliable LCD screen 30 is driven to the retraction position and winds around the peripheral surface of the axle 20, and is housed again in the housing compartment 16 of the case 10 as shown in FIG. 1.

In summary, the invention is a new product that fully uses the characteristics of the pliable LCD screen to be retracted and held in the case after use. It provides a new picture viewing method with significant improvements over the conventional techniques and products.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What is claimed is:

1. A display device adopted for use on data processing equipment to generate and display pictures according to image signals transferred from the data processing equipment, comprising:

a case having a housing compartment and an elongated slot on one side communicating with the housing compartment;

an axle turnable in the housing compartment;

a pliable LCD screen being a rollable flat sheet winding on the peripheral surface of the axle and being housed in the housing compartment;

a retaining member located on one side of the pliable LCD screen to receive a force to pull the pliable LCD screen and drive the axle turning in a positive direction so that the pliable LCD screen is stretched from the housing compartment through the elongated slot to a use position;

an elastic element having one end coupling on the case and other end coupling on the axle to provide a stretch returning elastic force to drive the axle to turn in a reverse direction so that the pliable LCD screen located at the use position is driven to wind around the peripheral surface of the axle to a retraction position; and a connection port for receiving the image signals and transferring the signals to the pliable LCD screen to generate and display the pictures, wherein the elastic element is coupled on the case through a leveling member fixedly located in the case.

2. The display device of claim 1, wherein the axle has a housing chamber to hold the leveling member.

3. The display device of claim 2, wherein the elastic element is coupled on the leveling member and housed in the housing chamber.

4. The display device of claim 1, wherein the elastic element is a helical spring.

5. The display device of claim 1, further having an electric power module located in the housing compartment of the case to provide driving electric power for operation of the pliable LCD screen.

6. The display device of claim 1 further having a radio transmission unit located on one side of the case to electrically connect to the connection port for receiving external radio signals and transferring to the data processing equipment.

7. The display device of claim 1, wherein the case has an input module located on one side thereof to electrically connect to the connection port to operate and control the data processing equipment.

8. The display device of claim 7, wherein the input module includes a track ball and a plurality of function keys.

9. A display device adopted for use on data processing equipment to generate and display pictures according to image signals transferred from the data processing equipment, comprising:

a case having a housing compartment and an elongated slot on one side communicating with the housing compartment;

an axle turnable in the housing compartment;

a pliable LCD screen being a rollable flat sheet winding on the peripheral surface of the axle and being housed in the housing compartment;

a retaining member located on one side of the pliable LCD screen to receive a force to pull the pliable LCD screen and drive the axle turning in a positive direction so that the pliable LCD screen is stretched from the housing compartment through the elongated slot to a use position;

an elastic element having one end coupling on the case and other end coupling on the axle to provide a stretch returning elastic force to drive the axle to turn in a reverse direction so that the pliable LCD screen located at the use position is driven to wind around the peripheral surface of the axle to a retraction position; and a connection port for receiving the image signals and transferring the signals to the pliable LCD screen to generate and display the pictures, wherein the retaining member has one end which has a suction cup located thereon.

* * * * *